United States Patent [19]
Yotsumoto

[11] 3,737,002
[45] June 5, 1973

[54] SUCTION GAS PROTECTIVE DEVICE IN MOTOR VEHICLE

[75] Inventor: Kokichi Yotsumoto, Sagamihara, Japan

[73] Assignee: Caterpillar Mitsubishi Ltd., Tokyo, Japan

[22] Filed: Sept. 10, 1970

[21] Appl. No.: 71,052

[52] U.S. Cl..................180/69 R, 55/385, 55/502
[51] Int. Cl...................B60k 13/02, B01d 50/00
[58] Field of Search..................55/342, 337, 385, 55/449, 456, 457, 250, 502; 180/69 R, 54 A, 69 C; 277/235

[56] References Cited

UNITED STATES PATENTS

| | | |
|---|---|---|
| 1,873,252 | 8/1932 | Altgelt..................55/385 |
| 2,973,830 | 3/1961 | Gruner..................55/499 |
| 3,017,944 | 1/1962 | Norrie..................180/69 C |
| 3,293,830 | 12/1966 | McKinley..................55/385 |
| 3,436,900 | 4/1969 | Evens et al...............55/385 |
| 3,104,883 | 9/1963 | English et al............277/235 |

*Primary Examiner*—Bernard Nozick
*Attorney*—Fryer, Tjensvold, Feix, Phillips & Lempio

[57] ABSTRACT

A device including a conduit extending through an opening in a hood of a vehicle and having a circular protection means disposed about the conduit and the opening and serving as a passageway for conducting air from an inlet disposed in the hood into the passageway and thence into the conduit which in turn is connected to an air cleaner.

1 Claim, 4 Drawing Figures

SUCTION GAS PROTECTIVE DEVICE IN MOTOR VEHICLE

The present invention relates to a suction device attached to an internal combustion engine loaded on a construction or earth-moving machine such as a tractor. The afore-mentioned machine is subjected to the operation in an environment filled with dust, and consequently the suction device consists of a combination of a precleaner and second air cleaner. That is, the air sucked into an engine is initially free from dust having comparatively large particles with a precleaner and is given a second cleaning with a second aircleaner to further make a clean air. And it is usual to select as high a place as possible of the surface of an engine cover as a position of a precleaner. What disadvantages conventional precleaners have and how the present invention has been made will be described below. The operation in the cold district, particularly in the severe cold district such as Siberia where temperature drops to − 20° C in winter, causes trouble. That is, the air of low temperature of snow flakes are directly sucked from the suction port of the precleaner and reaches the engine via an air cleaner. Thus, the function of the engine is lowered and the normal operation is impossible to maintain. This is a very serious problem in the field operation. The present invention is directed to the elimination of this disadvantage and provides a detachable protective plate at the conventional suction port, taking advantage of the relative position of the precleaner and the engine cover. A new suction port is bored on the side of the engine cover, that is, the lower portion of the precleaner. By this, suction efficiency is not disadvantageously affected.

Accordingly, it is the object of the present invention to improve the structure of a precleaner so that the operation in the severe cold is not impeded.

It is another object of the present invention to prevent the fall of starting characteristics of the engine in a cold season.

The present invention will be described referring to the accompanying drawings.

Figure 1:
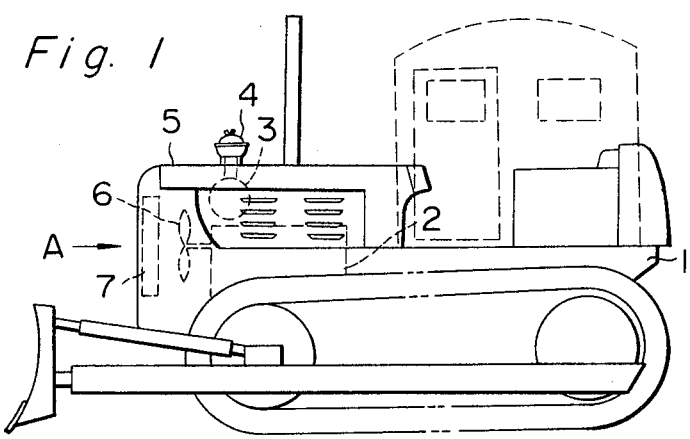
FIG. 1 is a side view of a construction machine provided with an internal combustion engine.

In FIG. 1 engine 2 is mounted in tractor 1; air cleaner 3 and precleaner 4 are positioned above engine 2. In front of engine 2 are suction fan 6 and radiator 7 disposed. As described before, precleaner 4 is usually mounted on engine hood cover 5.

The air is fed into engine 2 via precleaner 4 and air cleaner 3. The cooling water for engine 2 is cooled by the radiator 7 to be circulated. At this time, the air sucked with suction fan 6 passes through radiator 7 to have its temperature raised. It is desired that when the operation is done in a cold district, the warmed air be utilized as the suction air for engine 2.

Figure 2:
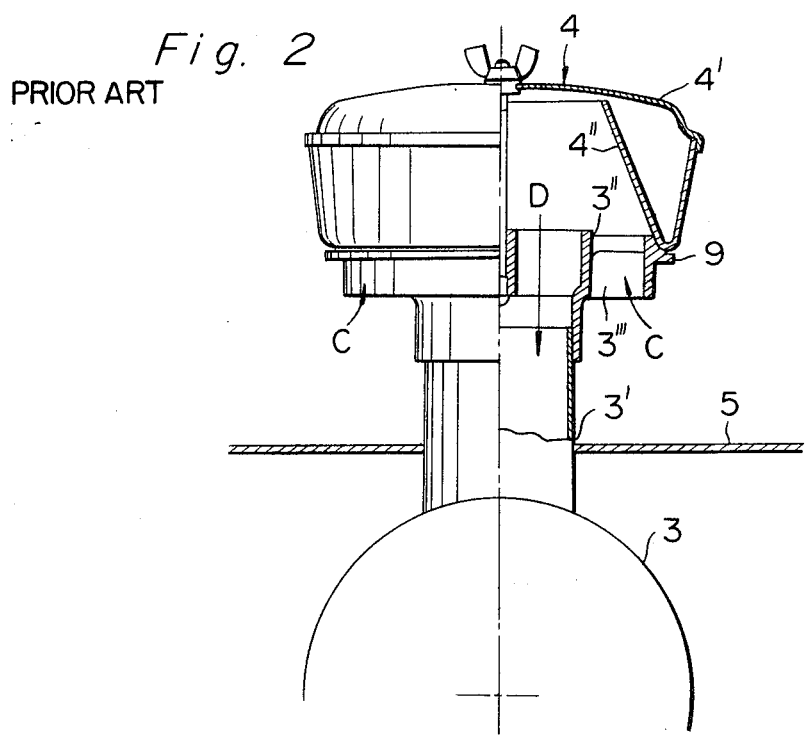
FIG. 2 is a side view partially broken down of a conventional precleaner.

In FIG. 2 precleaner 4 of a well-known type is illustrated. Suction pipe 3' is disposed above air cleaner 3; at the upper end of suction pipe 3' is central suction port 3'' disposed, rim 9 of precleaner 4 concentric with central suction port 3'' makes annular space 3''' with central suction port 3'', which is used as a suction port. Above rim 9 is cap 4' disposed, in which is formed circular truncated cone 4''. Air is introduced along the periphery of central suction pipe 3' as shown by arrow c. The introduced air goes up, is led with circular truncated cone 4'', gathered in the center, and flows into air cleaner 3 as shown by arrow D, during which case some of dust flowing together with the air collides with the peripheral surface of suction pipe 3' or of suction port 3 of the central suction pipe and drops there; some drops colliding the inner surface of circular truncated cone 4''; and others are accumulated in dust collecting chamber 4''', via cap 4'. Such is the dust-arresting action of precleaner 4. As described before, the suction port are open on all sides in such well-known types of precleaners; consequently snow flakes or lumps as well as the cold air flow in easily. In order to prevent them flowing in circular truncated cone 4'' can be disposed in two or three layers, but the effect thereof can not be fully developed in the operation in the snowy district.

Figure 3:
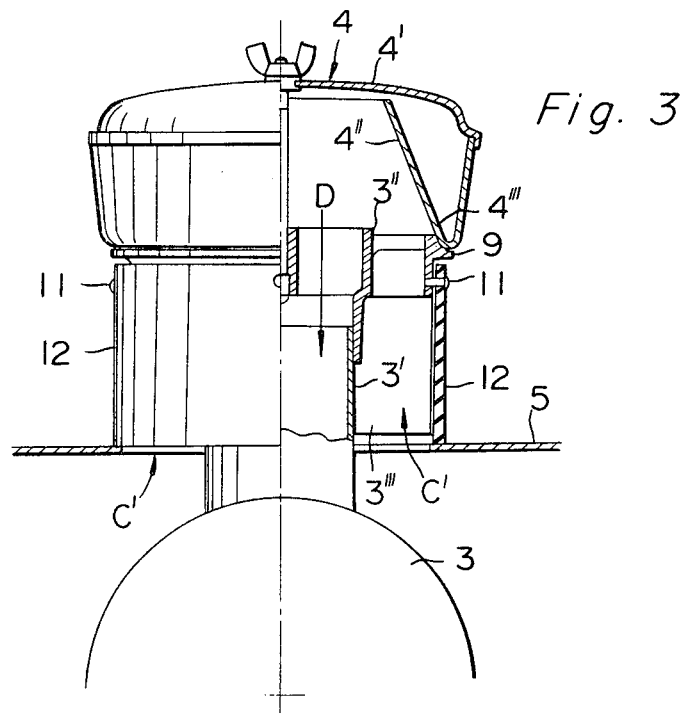
FIG. 3 is a side view partially broken down of the precleaner of the present invention.
Figure 4:
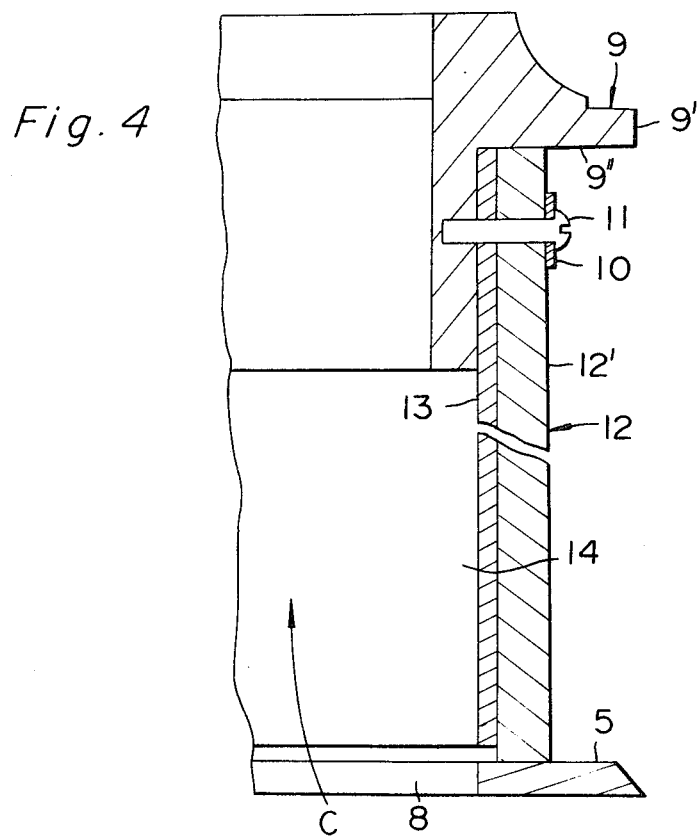
FIG. 4 is a cross sectional view partially enlarged of the precleaner of the present invention.

In the present invention, as shown in FIGS. 3 and 4, the whole space between rim 9 and engine cover 5 is enclosed with protection plate 12. Thus annular space 14 partitioned by the bottom of the protection plate and the periphery of suction pipe 3' makes suction port 3''''. An opening corresponding to suction port 3'''' is previously bored in engine cover 5. The protection plate is as shown in FIG. 4, composed of thin metallic plate cylinder 13 the outside of which is covered with thick rubber or rubber-like material 12'. Said plate 12 is closely and detachably engaged with lower periphery 9'' of rim 9 with screw 11 and washer 10.

As described above, in present invention suction port 3'''' is positioned differently from a conventional precleaner. That is, in FIG. 2 suction port 3'''' of a well-known type is open on all sides. With a structure such as to introduce dust, snow flakes, etc. very easily, the precleaner cannot be used at all in the frigid district. On the contrary, as shown in FIG. 3, the present invention provides protective plate 12 enclosing the lower part of rim 9 and suction port 3'''' near the surface of engine cover 5. Thus not only is the entry of foreign matter prevented but also the following effect is obtained: As shown in FIG. 1, the air is sucked in the direction of arrow A with suction fan 6 driven by internal combustion engine 2 mounted on the tractor 1, passed through radiator 7 to a given temperature rise by the heat exchange (then prevailing), and released in the engine chamber. The released warm air is flowed out through air outlets disposed on the sides of the engine cover. An embodiment of the present invention is shown in FIG. 3, in which an opening is bored in the engine cover so that it is connected with suction, into precleaner 4 as shown by arrow C', passed through air cleaner 3, and supplied to the internal combustion engine. With this course of suction, if snow flakes pass through the radiator, they will become a warm air by the epothermic temperature of the engine, while they are melting. In other words, the radiator serves to obtain a preliminary snow arresting effect and as a result an appropriately warmed air is fed into the precleaner. Further the periphery of precleaner is covered with thick protection plate 12 to prevent snow, rain, cold air from entering the precleaner.

In this case, even if there is a big difference in temperature between the air in the precleaner and the open air, and there occurs the swelling or contraction of the protection plate due to the difference, the plate is supported by the thin metallic plate closely engaged with the inside of the protection plate and prevented from bending or shearing due to vibrations. With a precleaner of the present invention provided, a tractor can continue operations even in an extremely cold district. And in a warm district protection plate 12 may be detached by loosening screw 11 resulting in a conventional precleaner as shown in FIG. 2. The engine cover may be used as it is without closing the opening in the engine cover. The warm air passing through the radiator comes to conventional suction port 3''' to be properly mixed with the open air there and is fed into the precleaner. There is therefore, no bad effect on the engine.

As is clear from the description above, the present invention is directed to (1) providing a protective plate in a simple manner by utilizing the relative position between the existing engine over and precleaner (2) winterizing an earth-moving machine such as a tractor with the use of the protection plate, and (3) utilizing effectively the warm air passing through a radiator. When the tractor is used in a frigid district a cab is installed on the tractor as shown with a dotted line in FIG. 1 to protect an operator from cold.

I claim:

1. In combination with a vehicle having an internal combustion engine, an engine hood enclosing the engine, an air inlet in the hood and an opening in the hood spaced from the air inlet, an inlet conduit extending upwardly through said opening and spaced from the periphery of the opening and with one end connected to an air cleaner, an annular peripheral wall superposed and spaced from said opening, means mounting said wall outwardly and spaced from the conduit, a circular protecting means including means detachably connecting the same to the periphery of an end of said annular peripheral wall and projecting to and about said opening and extending to said hood, said circular protection means having an outer cylindrical elastomer shell and a contiguous inner concentric metallic stiffening shell with said outer cylindrical shell being slightly longer than said inner shell and operable to form a sealing engagement about the periphery of the opening in the top of said engine hood, a cover having a sidewall extending to the peripheral wall, means securing the cover to said peripheral wall and the spacing between said inlet conduit and said peripheral wall and said circular protection means defining an air inlet means whereby the flow of air passes from the air inlet in the hood through the opening in the hood to the air cleaner.

* * * * *